US012012858B1

(12) United States Patent
McCaffrey

(10) Patent No.: US 12,012,858 B1
(45) Date of Patent: Jun. 18, 2024

(54) FAILSAFE BLADE OUTER AIRSEAL RETENTION

(71) Applicant: RTX Corporation, Farmington, CT (US)

(72) Inventor: Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/308,963

(22) Filed: Apr. 28, 2023

(51) Int. Cl.
*F01D 11/16* (2006.01)
*F01D 25/24* (2006.01)

(52) U.S. Cl.
CPC ............ *F01D 11/16* (2013.01); *F01D 25/246* (2013.01); *F05D 2240/55* (2013.01); *F05D 2260/30* (2013.01)

(58) Field of Classification Search
CPC .... F01D 11/16; F01D 25/246; F05D 2240/55; F05D 2260/30
See application file for complete search history.

(56) References Cited

U.S. PATENT DOCUMENTS 7,303,371 B2 12/2007 Tiemann
9,188,062 B2 11/2015 Tsutsumi et al.
9,228,447 B2 1/2016 McCaffrey
9,915,163 B2 3/2018 McCaffrey
10,280,784 B2 5/2019 McCaffrey
10,415,417 B2 9/2019 McCaffrey
10,415,419 B2 9/2019 Sun et al.
11,131,207 B1 9/2021 Farris et al.
2016/0084101 A1* 3/2016 McCaffrey ................ F01D 5/12 415/173.3
2016/0312644 A1* 10/2016 Blaney .................... F01D 11/20
2016/0333721 A1* 11/2016 McCaffrey .............. F01D 11/22
2016/0356170 A1* 12/2016 Davis ...................... F01D 11/22
2017/0067354 A1* 3/2017 McCaffrey .............. F01D 11/08
2017/0268366 A1* 9/2017 McCaffrey ............ F01D 25/246
2017/0268369 A1* 9/2017 McCaffrey ................ F01D 5/02
2019/0120076 A1 4/2019 McCaffrey
2020/0224544 A1* 7/2020 Barker .................... F01D 11/08
2020/0362718 A1* 11/2020 Clark .................... F01D 11/005
2021/0131299 A1* 5/2021 Lutjen .................... F01D 11/08
2021/0131300 A1* 5/2021 Arbona ................ F01D 25/246

FOREIGN PATENT DOCUMENTS

EP 3244024 A1 * 11/2017 .............. F01D 11/22
EP 3276041 A1 * 1/2018 ............. C23C 14/30

* cited by examiner

*Primary Examiner* — Grant Moubry
*Assistant Examiner* — Ruben Picon-Feliciano
(74) *Attorney, Agent, or Firm* — CANTOR COLBURN LLP

(57) ABSTRACT

A blade outer airseal (BOAS) assembly of a gas turbine engine includes a BOAS segment, and a BOAS carrier located radially outboard of the BOAS segment relative to an engine central longitudinal axis. The BOAS segment secured to the BOAS carrier. The BOAS assembly is selectably radially movable during operation of the gas turbine engine. One or more secondary retention features are configured to limit the radial movement of the BOAS assembly.

18 Claims, 6 Drawing Sheets

FAILSAFE BLADE OUTER AIRSEAL RETENTION

BACKGROUND

Exemplary embodiments of the present disclosure pertain to the art of gas turbine engines, and in particular to blade outer air seal (BOAS) configurations of turbine sections or compressor sections of gas turbine engines.

During a typical rapid acceleration of a gas turbine engine, the rotors of the turbine and/or compressor expand radially outwardly more rapidly than the corresponding blade outer airseals (BOAS). This results in a pinch condition and excessive rub of the BOAS, resulting in an increased radial clearance between the rotor blade tip and the BOAS when the engine returns to a cruise operating condition. This increased clearance reduces performance of the gas turbine engine.

The art would welcome a configuration allowing for rapid radially outward movement of the BOAS during such rapid accelerations.

BRIEF DESCRIPTION

In one embodiment, a blade outer airseal (BOAS) assembly of a gas turbine engine includes a BOAS segment, and a BOAS carrier located radially outboard of the BOAS segment relative to an engine central longitudinal axis. The BOAS segment secured to the BOAS carrier. The BOAS assembly is selectably radially movable during operation of the gas turbine engine. One or more secondary retention features are configured to limit the radial movement of the BOAS assembly.

Additionally or alternatively, in this or other embodiments the BOAS segment is secured to the BOAS carrier via one or more retention hooks.

Additionally or alternatively, in this or other embodiments the one or more secondary retention features includes a carrier support hook extending from the BOAS carrier. The carrier support hook is configured to engage an axially adjacent vane support lip.

Additionally or alternatively, in this or other embodiments the carrier support hook extends axially forwardly from the BOAS carrier.

Additionally or alternatively, in this or other embodiments the one or more secondary retention features includes a retaining flange extending from the BOAS segment configured to engage an axially adjacent vane platform of the gas turbine engine.

Additionally or alternatively, in this or other embodiments the retaining flange extends axially aftwardly from the BOAS segment.

Additionally or alternatively, in this or other embodiments an adjustment lever is operably connected to the BOAS carrier, and rotation of the adjustment lever about a pivot axis urges movement of the BOAS segment in a radial direction.

In another embodiment, a turbine section of a gas turbine engine includes a turbine rotor positioned at an engine central longitudinal axis, and a blade outer airseal (BOAS) assembly is located radially outboard of the turbine rotor. The BOAS assembly includes a plurality of BOAS segments arrayed circumferentially about the engine central longitudinal axis, and a plurality of BOAS carriers located radially outboard of the plurality of BOAS segments. Each BOAS carrier is supportive of at least one BOAS segment. The BOAS assembly is selectably radially movable during operation of the gas turbine engine. One or more secondary retention features are configured to limit the radial movement of the BOAS assembly.

Additionally or alternatively, in this or other embodiments each BOAS segment of the plurality of BOAS segments is secured to a respective BOAS carrier of the plurality of BOAS carriers via one or more retention hooks.

Additionally or alternatively, in this or other embodiments the one or more secondary retention features includes a carrier support hook extending from the BOAS carrier. The carrier support hook is configured to engage an axially adjacent vane support lip.

Additionally or alternatively, in this or other embodiments the carrier support hook extends axially forwardly from the BOAS carrier.

Additionally or alternatively, in this or other embodiments the one or more secondary retention features includes a retaining flange extending from the BOAS segment configured to engage an axially adjacent vane platform of the gas turbine engine.

Additionally or alternatively, in this or other embodiments the retaining flange extends axially aftwardly from the BOAS segment.

Additionally or alternatively, in this or other embodiments the BOAS assembly includes a plurality of adjustment levers. Each adjustment lever is operably connected to at least one BOAS carrier of the plurality of BOAS carriers. Rotation of each adjustment lever about a respective pivot axis urges movement of the plurality of BOAS segments in a radial direction thereby adjusting a radial gap between the turbine rotor and the plurality of BOAS segments.

In yet another embodiment, a gas turbine engine includes a combustor, and a turbine section driven by combustion products from the combustor. The turbine section includes a turbine rotor positioned at an engine central longitudinal axis, and a blade outer airseal (BOAS) assembly located radially outboard of the turbine rotor. The BOAS assembly includes a plurality of BOAS segments arrayed circumferentially about the engine central longitudinal axis, and a plurality of BOAS carriers located radially outboard of the plurality of BOAS segments. Each BOAS carrier is supportive of at least one BOAS segment. The BOAS assembly is selectably radially movable during operation of the gas turbine engine, and one or more secondary retention features are configured to limit the radial movement of the BOAS assembly.

Additionally or alternatively, in this or other embodiments the one or more secondary retention features includes a carrier support hook extending from the BOAS carrier, the carrier support hook configured to engage an axially adjacent vane support lip.

Additionally or alternatively, in this or other embodiments the carrier support hook extends axially forwardly from the BOAS carrier.

Additionally or alternatively, in this or other embodiments the one or more secondary retention features includes a retaining flange extending from the BOAS segment configured to engage an axially adjacent vane platform of the gas turbine engine.

Additionally or alternatively, in this or other embodiments the retaining flange extends axially aftwardly from the BOAS segment.

Additionally or alternatively, in this or other embodiments the BOAS assembly includes a plurality of adjustment levers. Each adjustment lever is operably connected to at least one BOAS carrier of the plurality of BOAS carriers. Rotation of each adjustment lever about a respective pivot axis urges movement of the plurality of BOAS segments in a radial direction thereby adjusting a radial gap between the turbine rotor and the plurality of BOAS segments.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
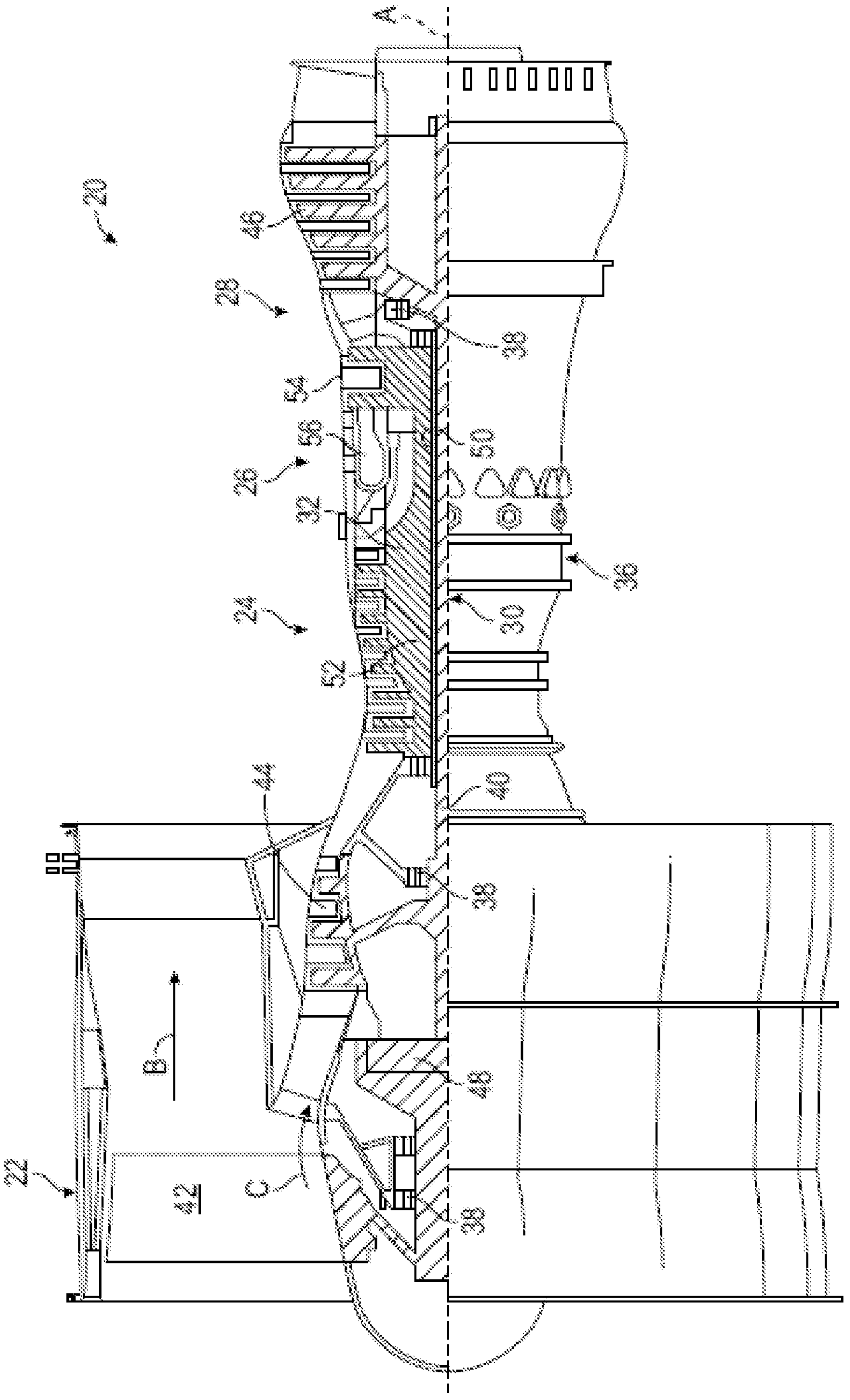
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ° \text{R})/(518.7°\ \text{R})]^{0.5}$. The "Low corrected fan tip speed" as disclosed herein according to one non-limiting embodiment is less than about 1150 ft/second (350.5 m/sec).

Figure 2:
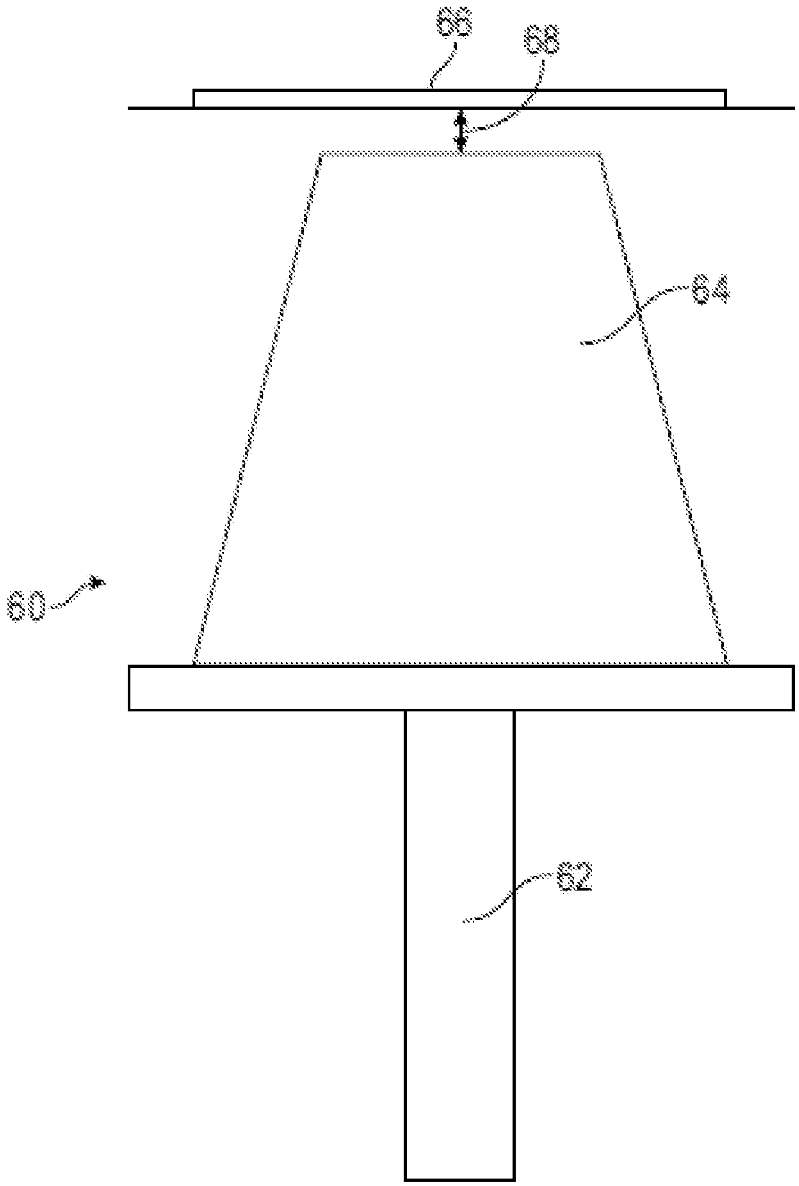
FIG. 2 is a partial cross-sectional view of an embodiment of a rotor assembly.

Illustrated in FIG. 2 is a partial cross-section of a rotor 60, for example a rotor of the high pressure turbine 54. One skilled in the art, however, will appreciate that the present disclosure may be readily applied to other rotors of the gas turbine engine 20, for example, the low pressure turbine 46, the low pressure compressor 44, or the high pressure compressor 52. The rotor 60 includes a rotor disc 62 and a plurality of rotor blades 64 extending radially outwardly from the rotor disc 62. The rotor 60 is configured to rotate about the engine central longitudinal axis A. The rotationally stationary structure surrounding the rotor 60 includes a plurality of blade outer airseals (BOAS) 66. The BOAS 66 at least partially defines a blade clearance 68 between the plurality of rotor blades 64 and the BOAS 66.

Figure 3:
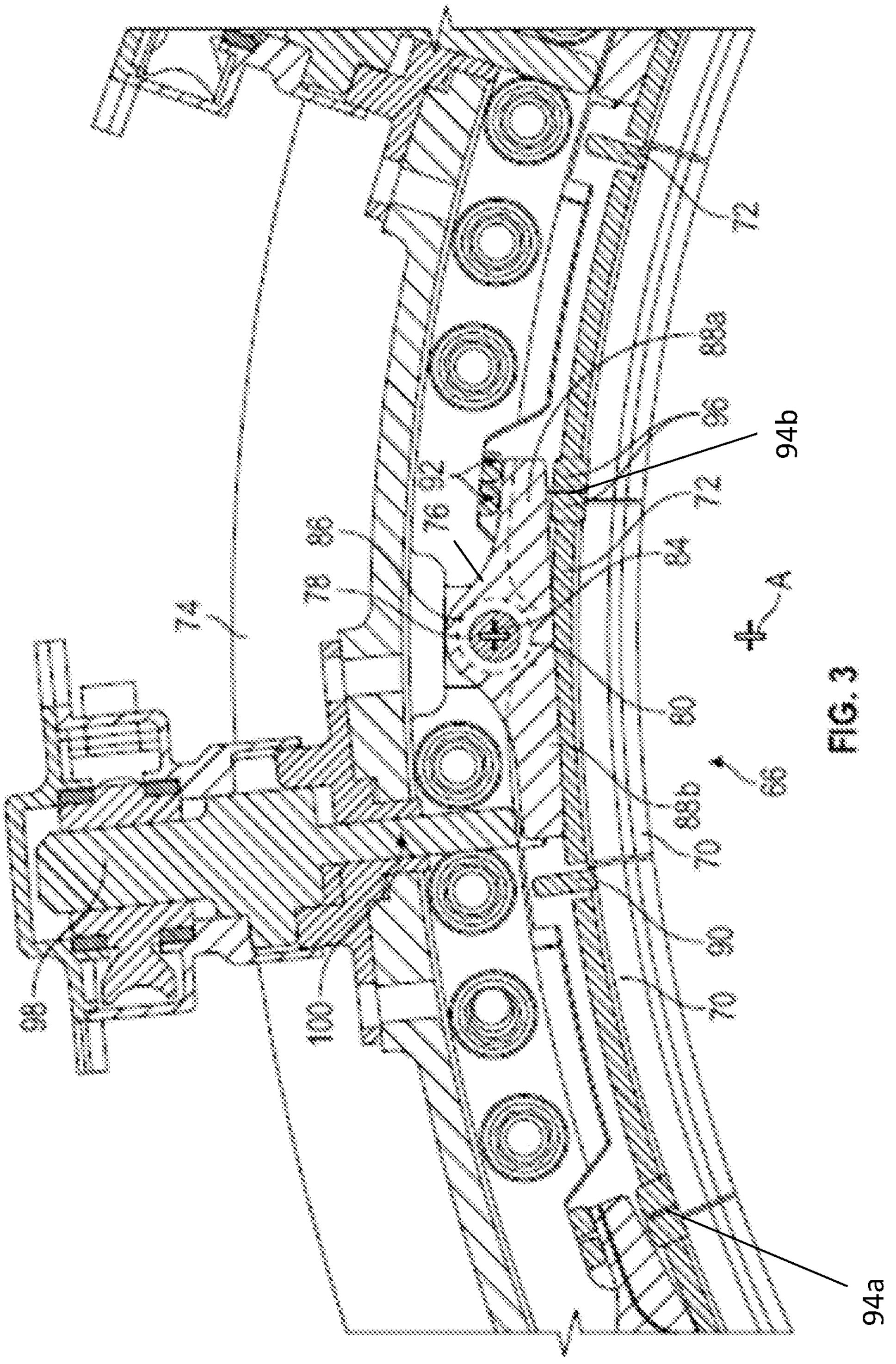
FIG. 3 is a partial cross-sectional view of an embodiment of a blade outer airseal assembly.

Referring now to FIG. 3, a cross-sectional view of a BOAS 66 configuration is illustrated. The BOAS 66 includes a plurality of BOAS segments 70 arrayed circumferentially around the engine central longitudinal axis A. While the embodiment of FIG. 3 includes 30 BOAS segments 70, that number is merely exemplary and other quantities of BOAS segments 70 may be utilized. The BOAS segments 70 are retained in BOAS carriers 72 located radially outboard of the BOAS segments 70. In some embodiment, such as illustrated, each BOAS carrier 72 has two BOAS segments 70 secured thereto, while in other embodiments each BOAS carrier 72 may carry, for example, one or three BOAS segments 70. The BOAS carriers 72 are movably retained in a case member 74 located radially outboard of the BOAS carriers 72, so that the BOAS carriers 72 and thus the BOAS segments 70 are movable in a radial direction.

To effect movement of the BOAS segments 70, the BOAS carriers 72 are operably connected to a plurality of adjustment levers 76 secured to the case member 74. The adjustment levers 76 are each retained at the case member 74 via a pin 78 extending through a lever pivot 80 and a casing flange 82, best shown in FIG. 4. The pin 78 defines a lever axis 84 about which the adjustment lever 76 is rotatable. The pin 78, in this example, has a shoulder which engages a recess in casing flange 82 coupled with the cover plate 122, which both, combined, prevent relative motion of the pin 78 along lever axis 84. Referring again now to FIG. 3, the adjustment lever 76 has a hub portion 86 through which the pin 78 extends and two lever arms 88 extending opposite circumferential directions from the hub portion 86. The BOAS carriers 72 each have a carrier body 90 which supports the BOAS segments 70 and a carrier flanges 92 at each circumferential end **94*a*, 94*b* of the BOAS carrier 72. The carrier flanges 92 extend radially outwardly from the carrier body 90 and each include a flange opening 96, such as a slot or hole through which a first lever arm 88*a* extends. As illustrated in FIG. 3, the first lever arm 88*a* extends through flange openings 96 of two circumferentially adjacent BOAS carriers 72. In operation, rotation of the adjustment lever 76 about the lever axis 84 moves the BOAS carriers 72 radially inwardly and outwardly depending on the direction of the rotation, and thus likewise adjusts a radial position of the BOAS segments 70. Because each first lever arm 88*a* extends through flange openings 96 of two adjacent BOAS carriers 72, operation of each adjustment lever 76 actuates two circumferentially adjacent BOAS carriers 72**.

Figure 4:
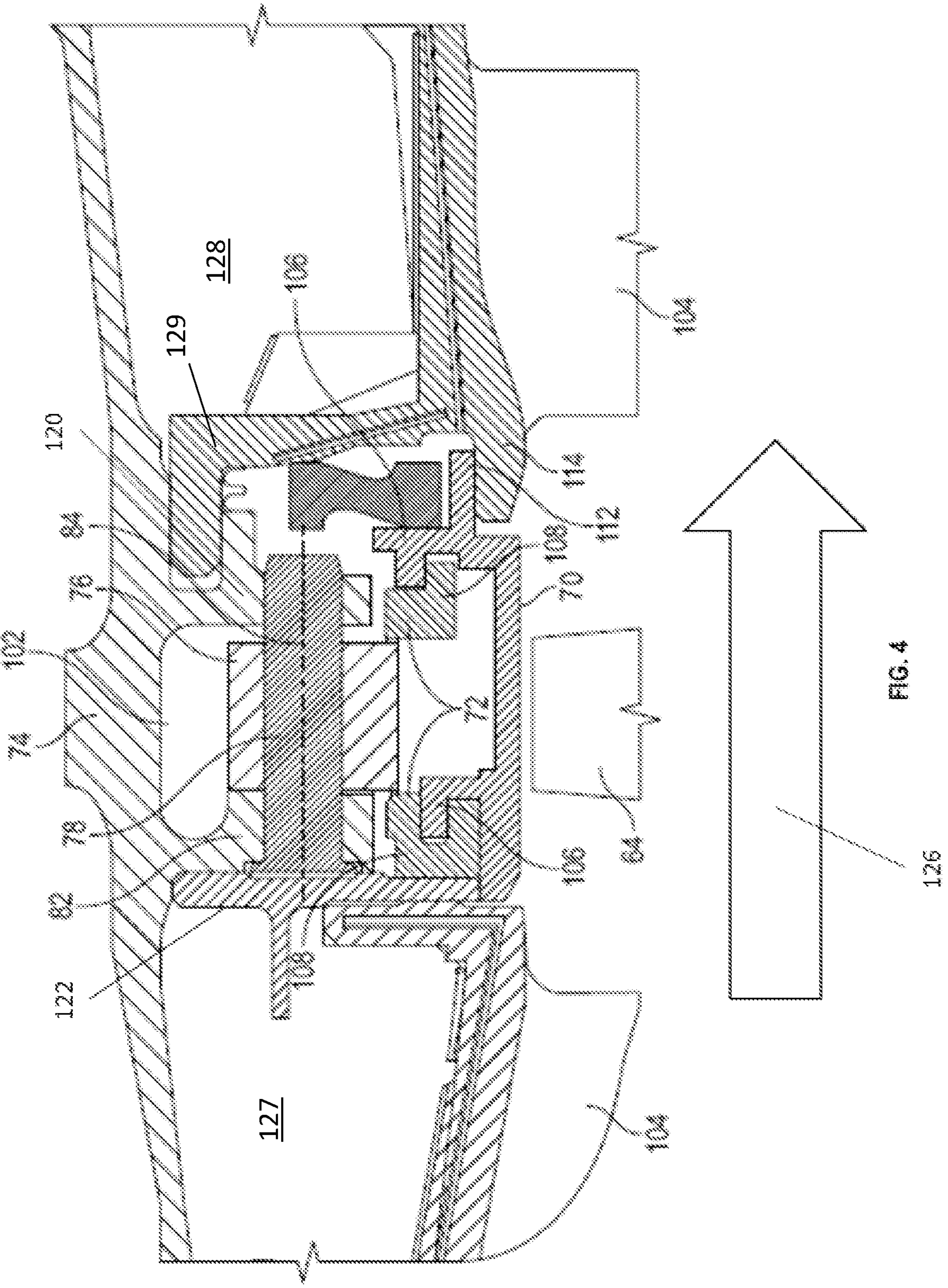
FIG. 4 is another partial cross-sectional view of an embodiment of a blade outer airseal assembly.

The rotation of the adjustment lever 76 is driven and controlled by an actuator 98 operably connected to the adjustment lever 76. In one embodiment, illustrated in FIG. 3, the actuator 98 is a high-force, short-stroke linear actuator 98 positioned such that the actuator piston 100 contacts a second lever arm **88*b* of the adjustment lever 76. The force exerted on the second lever arm 88*b* by the actuator piston 100 drives rotation of the adjustment lever 76 about the lever axis 84, thus urging radial movement of, and controlling the position of the BOAS segments 70. The use of a lever increases the stroke length of the actuator 98 versus the relative motion of the BOAS segments 70. This improves the position control of the BOAS segment 70 because the larger stroke of the actuator enables more precision in the measurement system within the actuator 98 and reduces the size and weight of the actuator 98 for a given BOAS segment 70 load. While a linear actuator 98 arrangement is utilized in the embodiment of FIG. 3, one skilled in the art will readily appreciate that this is merely exemplary and that other types of actuators may be utilized in other embodiments. Referring to FIG. 4, the aerodynamic design of turbines typically specifies the smallest possible axial spacing between adjacent rows of blades 64 and stator vane 104 to improve performance and reduce weight. Thus, the axial spacing between adjacent stator vane 104 components is also minimized and results in minimal axial space for the BOAS segments 70, BOAS carriers 72, and adjustment lever 76**.

Referring again to FIG. 4, the adjustment levers 76, the pin 78, and the BOAS carriers 72 are located axially in a common cavity 102 defined in the casing element 74 between axially adjacent stator vane 104 components. More particularly, the common cavity 102 is defined in part by the casing flange 82 and an aft flange 120 located rearward of the casing flange 82. The adjustment lever 76 is located between the casing flange 82 and the aft flange 120, with the pin 78 extending through both the casing flange 82 and the aft flange 120 and the adjustment lever 76 to retain the adjustment lever 76. In some embodiments, a cover plate 122 is located axially upstream of the casing flange 82, covering the casing flange 82 and the pin 78 to improve isolation and sealing from the upstream pressure cavity 127 into the common cavity 102. Further, in some embodiments, one or more seals 124 may be located in the common cavity 102 at, for example, an interface of the aft segment hooks 106 and vane platform leg 129, to improve isolation and sealing to the downstream pressure cavity 128. It should be understood that the total air pressure within upstream pressure cavity 127 is greater than flowpath 126 and the common cavity 102. Additionally, the pressure within common cavity 102 is greater than the downstream pressure cavity 128. Leakage losses reduce performance of the engine 20, and the inclusion of elements such as the cover plate 122 and the seals 124 further improves sealing and prevents leakage from the higher pressure within the common cavity 102 into the relatively lower pressure flowpath 126. This compact structure in which the adjustment mechanism components are located in the same common cavity 102 reduces potential leakage points and reduces the impact of the adjustment structure on the overall engine 20 configuration, and minimizes the fluid leakage resulting from inclusion of the adjustment structure.

Figure 5:
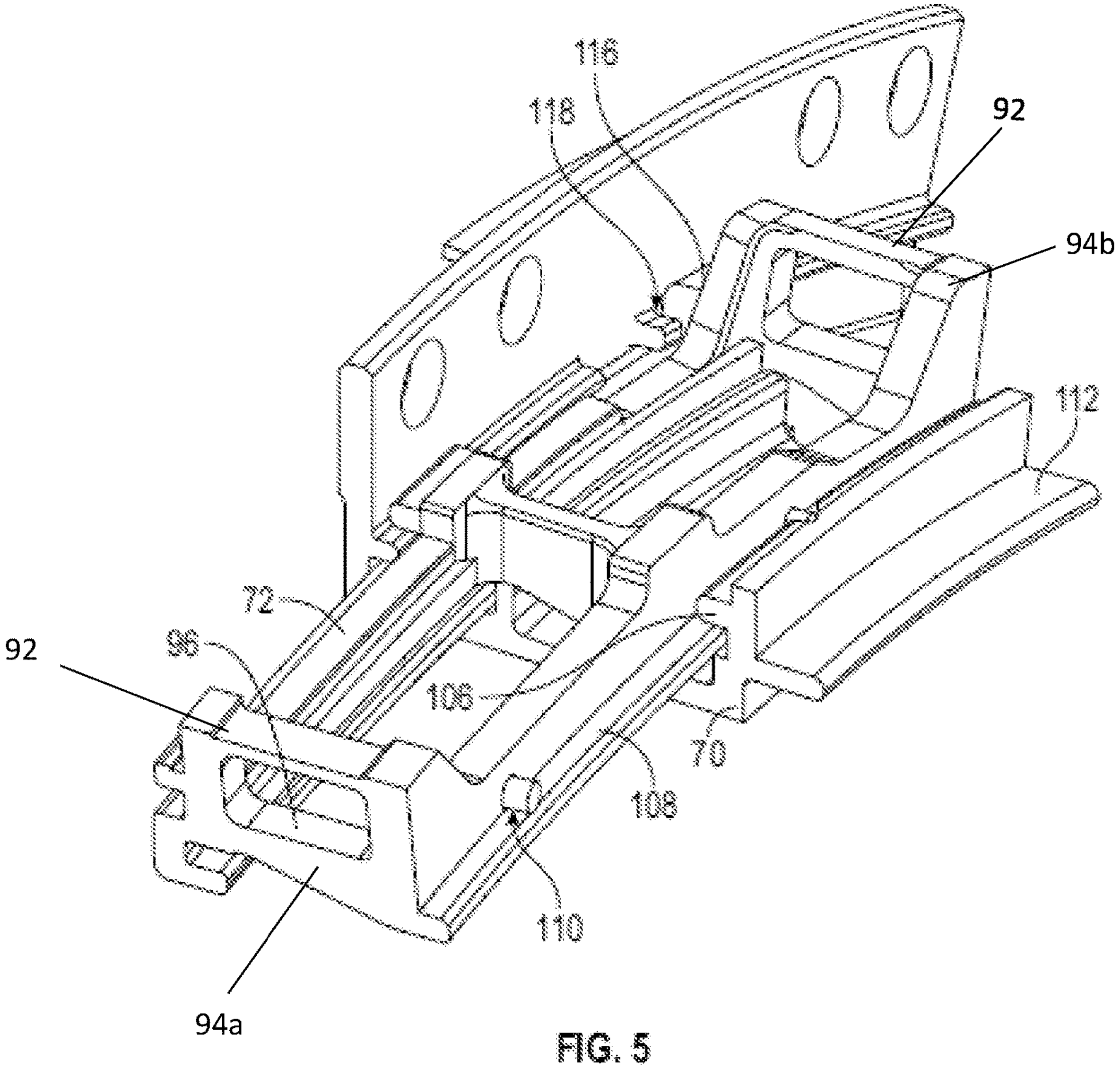
FIG. 5 is a partial perspective view of an embodiment of a blade outer airseal assembly.
Figure 6:
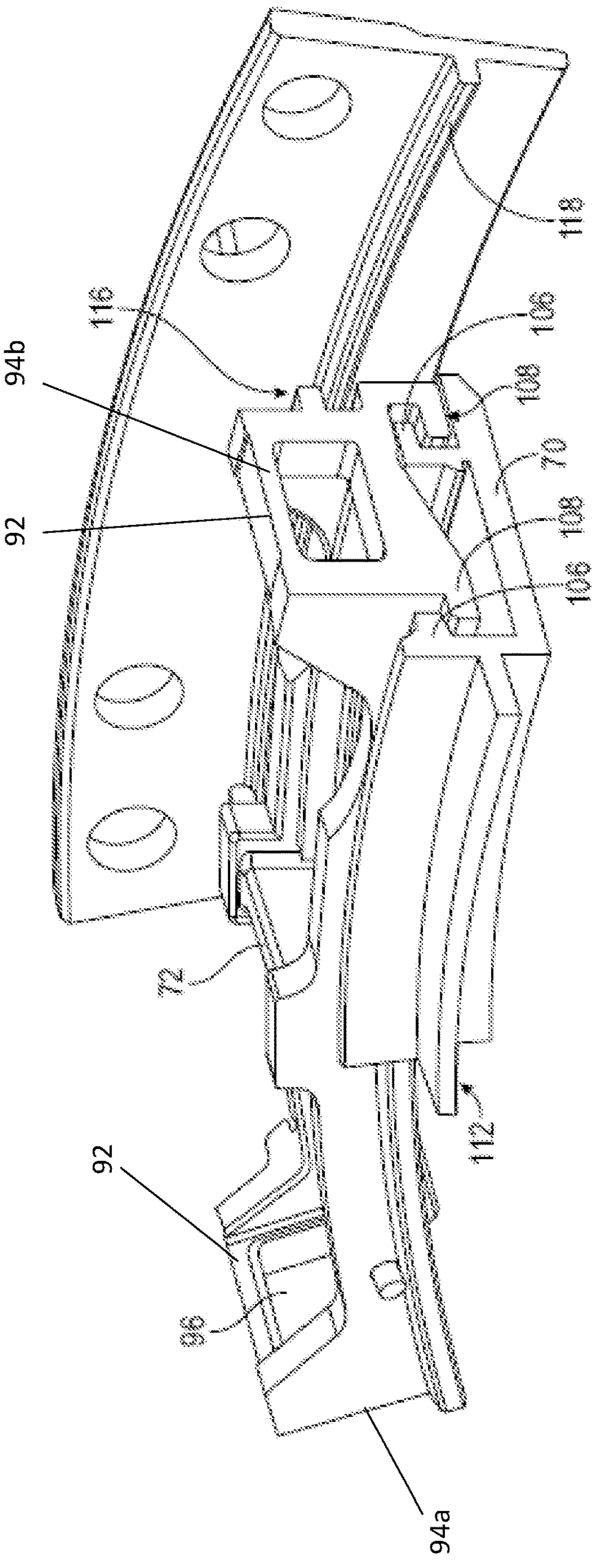
FIG. 6 is another partial perspective view of an embodiment of a blade outer airseal assembly.

Referring now to FIGS. 5 and 6, the BOAS segments 70 and the BOAS carriers 72 include features to act as secondary retention of the components in the event of failure of the adjustment mechanism, such as failure of the pin 78 and/or the lever 76. The BOAS segments 70 are retained radially to the BOAS carriers 72 by forward and aft segment hooks 106 that interact with complementary carrier engagement features 108 of the BOAS carrier 72. Further, one or more anti-rotation pins 110 are located between the BOAS segments 70 and the BOAS carrier 72 to circumferentially locate and retain the BOAS segments 70 relative to the BOAS carrier 72. In some embodiments, the BOAS segments 70 include aft retaining flanges 112 that extend axially rearwardly from the BOAS segment 70. As shown best in FIG. 4, at a maximum radially inward travel of the BOAS segment 70 the aft retaining flanges 112 rests on an axially adjacent vane platform 114. At a forward side of the BOAS carrier 72 the BOAS carrier 72 includes a carrier support hook 116 that limits radial travel of the BOAS carrier 72 at the forward end by engaging with a vane support lip 118.

The carrier support hook 116 and the aft retaining flanges 112 limit radial travel of the BOAS segments 70.

Referring again to FIG. 3, since each first lever arm 88*a* extends through flange openings 96 of two adjacent BOAS carriers 72, the two circumferentially adjacent BOAS segments 70 move together in a radial direction. This prevents the incidence of dams and waterfalls caused by radial mismatches of circumferentially adjacent BOAS segments 70.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade outer airseal (BOAS) assembly of a gas turbine engine, comprising:

a BOAS segment;

a BOAS carrier disposed radially outboard of the BOAS segment relative to an engine central longitudinal axis, the BOAS segment secured to the BOAS carrier;

wherein the BOAS assembly is configured to be selectably radially movable during operation of the gas turbine engine; and one or more secondary retention features configured to limit the radial movement of the BOAS assembly;

an adjustment lever operably connected to the BOAS carrier, the adjustment lever including:

a lever pivot about which the adjustment lever is configured to rotate; and two lever arms extending in opposing circumferential directions from the lever pivot; and an actuator operably connected to a lever arm of the two lever arms and circumferentially offset from the lever pivot, the actuator configured drive rotation of the lever arm about the lever pivot to urge selective radial movement of the of BOAS assembly during operation of the gas turbine engine.

2. The BOAS assembly of claim 1, wherein the BOAS segment is secured to the BOAS carrier via one or more retention hooks.

3. The BOAS assembly of claim 1, wherein the one or more secondary retention features includes a carrier support hook extending from the BOAS carrier, the carrier support hook configured to engage an axially adjacent vane support lip.

4. The BOAS assembly of claim 3, wherein the carrier support hook extends axially forwardly from the BOAS carrier.

5. The BOAS assembly of claim 1, wherein the one or more secondary retention features includes a retaining flange extending from the BOAS segment configured to engage an axially adjacent vane platform of the gas turbine engine.

6. The BOAS assembly of claim 5, wherein the retaining flange extends axially aftwardly from the BOAS segment.

7. A turbine section of a gas turbine engine, comprising:

a turbine rotor disposed at an engine central longitudinal axis; and a blade outer airseal (BOAS) assembly disposed radially outboard of the turbine rotor, the BOAS assembly including:

a plurality of BOAS segments arrayed circumferentially about the engine central longitudinal axis; and a plurality of BOAS carriers disposed radially outboard of the plurality of BOAS segments, each BOAS carrier supportive of at least one BOAS segment;

wherein the BOAS assembly is configured to be selectably radially movable during operation of the gas turbine engine; and one or more secondary retention features configured to limit the radial movement of the BOAS assembly;

an adjustment lever operably connected to the BOAS carrier, the adjustment lever including:

a lever pivot about which the adjustment lever is configured to rotate; and two lever arms extending in opposing circumferential directions from the lever pivot; and an actuator operably connected to a lever arm of the two lever arms and circumferentially offset from the lever pivot, the actuator configured drive rotation of the lever arm about the lever pivot to urge selective radial movement of the of BOAS assembly during operation of the gas turbine engine.

8. The turbine section of claim 7, wherein each BOAS segment of the plurality of BOAS segments is secured to a respective BOAS carrier of the plurality of BOAS carriers via one or more retention hooks.

9. The turbine section of claim 7, wherein the one or more secondary retention features includes a carrier support hook extending from the BOAS carrier, the carrier support hook configured to engage an axially adjacent vane support lip.

10. The turbine section of claim 9, wherein the carrier support hook extends axially forwardly from the BOAS carrier.

11. The turbine section of claim 7, wherein the one or more secondary retention features includes a retaining flange extending from the BOAS segment configured to engage an axially adjacent vane platform of the gas turbine engine.

12. The turbine section of claim 11, wherein the retaining flange extends axially aftwardly from the BOAS segment.

13. A gas turbine engine, comprising:

a combustor; and a turbine section driven by combustion products from the combustor, the turbine section including:

a turbine rotor disposed at an engine central longitudinal axis; and a blade outer airseal (BOAS) assembly disposed radially outboard of the turbine rotor, the BOAS assembly including:

a plurality of BOAS segments arrayed circumferentially about the engine central longitudinal axis; and a plurality of BOAS carriers disposed radially outboard of the plurality of BOAS segments, each BOAS carrier supportive of at least one BOAS segment;

wherein the BOAS assembly is configured to be selectably radially movable during operation of the gas turbine engine; and one or more secondary retention features configured to limit the radial movement of the BOAS assembly;

an adjustment lever operably connected to the BOAS carrier, the adjustment lever including:

a lever pivot about which the adjustment lever is configured to rotate; and two lever arms extending in opposing circumferential directions from the lever pivot; and an actuator operably connected to a lever arm of the two lever arms and circumferentially offset from the lever pivot, the actuator configured drive rotation of the lever arm about the lever pivot to urge selective radial movement of the of BOAS assembly during operation of the gas turbine engine.

14. The gas turbine engine of claim 13, wherein the one or more secondary retention features includes a carrier support hook extending from the BOAS carrier, the carrier support hook configured to engage an axially adjacent vane support lip.

15. The gas turbine engine of claim 14, wherein the carrier support hook extends axially forwardly from the BOAS carrier.

16. The gas turbine engine of claim 13, wherein the one or more secondary retention features includes a retaining flange extending from the BOAS segment configured to engage an axially adjacent vane platform of the gas turbine engine.

17. The gas turbine engine of claim 16, wherein the retaining flange extends axially aftwardly from the BOAS segment.

18. The gas turbine engine of claim 13, further comprising a plurality of adjustment levers, each adjustment lever operably connected to at least one BOAS carrier of the plurality of BOAS carriers;

wherein rotation of each adjustment lever about a respective pivot axis urges movement of the plurality of BOAS segments in a radial direction thereby adjusting a radial gap between the turbine rotor and the plurality of BOAS segments.

* * * * *